United States Patent
Park et al.

(10) Patent No.: US 7,586,498 B2
(45) Date of Patent: Sep. 8, 2009

(54) COLOR TEMPERATURE CONVERSION METHOD, MEDIUM, AND APPARATUS FOR PIXEL BRIGHTNESS-BASED COLOR CORRECTION

(75) Inventors: Dusik Park, Suwon-si (KR);
Changyeong Kim, Yongin-si (KR);
Seongdeok Lee, Suwon-si (KR);
Hoyoung Lee, Suwon-si (KR); Daewon Kim, Yongin-si (KR); Wonhee Choe, Gyeongiu-si (KR); Hyunwook Ok, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 765 days.

(21) Appl. No.: 11/067,360

(22) Filed: Feb. 28, 2005

(65) Prior Publication Data
US 2005/0195211 A1    Sep. 8, 2005

(30) Foreign Application Priority Data
Feb. 26, 2004    (KR) .................... 10-2004-0012987

(51) Int. Cl.
G09G 5/00 (2006.01)
G09G 5/02 (2006.01)
G06K 9/00 (2006.01)
G06K 9/36 (2006.01)
G06T 11/00 (2006.01)
H04N 9/73 (2006.01)

(52) U.S. Cl. ................ 345/593; 345/606; 345/619; 345/589; 345/690; 382/162; 382/167; 382/254; 382/300; 358/518; 358/519; 358/525; 348/441; 348/519; 348/655; 348/760

(58) Field of Classification Search ............ 345/593, 345/600, 581, 589, 597, 601, 606, 690, 618–619, 345/698–699, 204, 3.4; 382/162–167, 254, 382/300; 348/655, 712, 441, 469, 502, 519, 348/528, 538, 602, 624, 659, 671, 678, 760, 348/807
See application file for complete search history.

(56) References Cited

U.S. PATENT DOCUMENTS 5,130,789 A * 7/1992 Dobbs et al. ............. 358/500
(Continued)

FOREIGN PATENT DOCUMENTS
EP    0 741 492    11/1996
(Continued)

OTHER PUBLICATIONS

European Search Report issued Mar. 21, 2007 in corresponding European Patent Application No. 05251025.2-1241.

*Primary Examiner*—Wesner Sajous
(74) *Attorney, Agent, or Firm*—Staas & Halsey LLP (57) ABSTRACT

A color temperature conversion method, medium, and apparatus converting an image from one of a plurality of basic color temperatures provided by an image display device to another color temperature other than the plurality of basic color temperatures. Also, the conversion method and apparatus enable pixels of the image with different brightnesses to have different color temperatures according to a user' preference. The color temperature conversion method includes: calculating variables for determining a conversion range; determining whether based on the calculated variables the input pixel is to be color-temperature-converted by determining whether the input pixel is within the conversion range; and converting the color temperature of the input pixel by moving in the same direction as the reference point to the target point in amount proportional to the reference point displacement so that the input pixel can be automatically moved along with the reference point of the conversion range.

27 Claims, 7 Drawing Sheets

U.S. PATENT DOCUMENTS

| | | | |
|---|---|---|---|
| 5,384,601 A | 1/1995 | Yamashita et al. | 348/577 |
| 6,118,455 A * | 9/2000 | Hidaka et al. | 345/589 |
| 7,126,610 B2 * | 10/2006 | Hammond | 345/589 |
| 7,190,410 B2 * | 3/2007 | Inamura | 348/656 |
| 2002/0085750 A1 * | 7/2002 | Hoshuyama | 382/162 |
| 2002/0126302 A1 * | 9/2002 | Fukao | 358/1.9 |
| 2002/0163529 A1 * | 11/2002 | Evanicky | 345/600 |
| 2002/0191084 A1 * | 12/2002 | Kurokawa | 348/222.1 |
| 2003/0020736 A1 * | 1/2003 | Kimura et al. | 345/690 |
| 2003/0179175 A1 * | 9/2003 | Shigeta et al. | 345/101 |
| 2004/0006554 A1 * | 1/2004 | Kim et al. | 707/1 |
| 2005/0169522 A1 * | 8/2005 | Schoner | 382/167 |
| 2007/0115658 A1 * | 5/2007 | Mueller et al. | 362/231 |

FOREIGN PATENT DOCUMENTS

| | | |
|---|---|---|
| KR | 2002-0079348 | 10/2002 |
| WO | WO 2004/006588 | 1/2004 |

\* cited by examiner

COLOR TEMPERATURE CONVERSION METHOD, MEDIUM, AND APPARATUS FOR PIXEL BRIGHTNESS-BASED COLOR CORRECTION

CROSS-REFERENCE TO RELATED APPLICATIONS

This application claims the benefit of Korean Patent Application No. 10-2004-00012987, filed on Feb. 26, 2004, in the Korean Intellectual Property Office, the disclosure of which is incorporated herein in its entirety by reference.

BACKGROUND OF THE INVENTION

1. Field of the Invention

Embodiments of the present invention relate to color temperature conversion methods, media, and apparatuses, and more particularly, to color temperature conversion methods, media, and apparatuses converting an image from one of a plurality of basic color temperatures provided by an image display device to another color temperature other than the plurality of basic color temperatures, enabling pixels of the image with different brightnesses to have different color temperatures according to a user's preference.

2. Description of the Related Art

Conventional image display devices, e.g., those disclosed in U.S. Pat. Nos. 4,562,460, 4,633,299, 4,788,586, and 5,619,229, convert a color temperature of an image by adjusting the hue of the image or individually controlling red, green, and blue (RGB) video signals. Other conventional image display devices, e.g., those disclosed in U.S. Pat. Nos. 4,685,071 and 5,495,428, convert the color temperature of an image by using correlation matrices. However, these conventional image display methods may adversely affect image representations, especially when there is a large difference between a current basic color temperature of a given pixel and a target color temperature. The conventional image display devices convert color temperatures of an image, from the current basic color temperature to the target color temperature, thereby producing color distortions as if the image was forced to pass through a predetermined color filter. Such color distortions of the image may become more apparent in portions of the image representing the human skin, compared to other portions of the image because people can easily differentiate natural human skin colors from less natural ones.

SUMMARY OF THE INVENTION

Embodiments of the present invention provide color temperature conversion methods, media, and apparatuses that realize as natural an image, with a desired color temperature, as possible and can minimize color distortions of the image, especially in portions representing, for example, the human skin, by converting the color temperature of each pixel of the image based on the brightness and hue of each pixel of the image.

Additional aspects and/or advantages of the invention will be set forth in part in the description which follows and, in part, will be obvious from the description, or may be learned by practice of the invention.

According to an aspect of the present invention, there is provided a color temperature conversion method for a color temperature conversion apparatus that has a plurality of storage units, controls color temperature of an image display device by comparing a user-set color temperature and each of a plurality of basic color temperatures provided by the image display device and then compensates for color temperature of an input pixel based on comparison results. The color temperature conversion method includes: calculating variables for determining a conversion range, the conversion range being represented by a quadratic curve; determining whether based on the calculated variables the input pixel is to be color-temperature-converted by determining whether the input pixel is within the conversion range; receiving the user-set color temperature and then comparing the user-set color temperature with a basic color temperature of the image display device if the input pixel is to be color-temperature converted; calculating color coordinates of a target point based on the user-set color temperature if there are no matches for the user-set color temperature and for the basic color temperature, and calculating the color coordinates of the target point based on the plurality of basic color temperature that is the match for the user-set color temperature, if there is a match for the user-set color temperature and for the basic color temperature; and converting the color temperature of the input pixel by moving, in the same direction as the reference point to the target point in an amount proportional to the reference point displacement so that the input pixel can be automatically moved along with the reference point of the conversion range.

If the quadratic curve is an oval, the calculating of variables for determining a conversion range may include: calculating a basic length of the oval and the lengths of the major and minor axes of the oval with reference to a first storage unit; and calculating coefficients for a rotation matrix based on the angle of the major axis of the oval with the X-axis of the color coordinate system with reference to the first storage unit.

The first storage unit may store an adjustment factor for the length of the major axis of the oval, an adjustment factor for the minor axis of the oval, the angle of the major axis of the oval with the X-axis of the color coordinate system, and a brightness scaling factor.

The calculating of the color coordinates of the target point based on the user-set color temperature may include: searching a second storage unit's plurality of basic brightnesses (provided by the image display device) and obtaining two sample brightnesses that are most similar to the input pixel; reading from the second storage unit four pairs of sample color coordinates corresponding to combinations of the user-set color temperature and the two sample brightnesses; and calculating the color coordinates of the target point through interpolation by using the four pairs of sample color coordinates.

The second storage unit may store a plurality of basic color temperatures for each brightness and respective pairs of color coordinates.

The calculating of the color coordinates of the target point based on one of the basic color temperature that is the match for the user-set color temperature, may include: searching a third storage unit's plurality of basic brightnesses (provided by the image display device) and obtaining two sample brightnesses that are most similar to the input pixel; reading two pairs of sample color coordinates corresponding to combinations of the basic color temperature that is the match for the user-set color temperature and the two sample brightnesses; and calculating the color coordinates of the target point through interpolation by using the two pairs of sample color coordinates.

The third storage unit may store one basic color temperature and pairs of color coordinates respectively corresponding to the basic brightnesses.

In the calculating the color coordinates of the target point based on the basic color temperature that is the match for the user-set color temperature, the color coordinates of the target point may be obtained from the third storage unit that stores one basic color temperature and pairs of color coordinates respectively corresponding to the basic brightnesses.

The calculating of the color coordinates of a target point based on the user-set color temperature may include: calculating a distance between the quadratic curve and a first point; and calculating color coordinates of a point, to which the input pixel is to be automatically moved along with the reference point of the conversion range, by using the distance between the quadratic curve and the first point and the color coordinates of the target point.

The calculating of the distance between the quadratic curve and the first point may include: moving the reference point of the quadratic curve to the origin of the color coordinate system; rotating the quadratic curve by a predetermined rotation angle by using a rotation matrix so that the input pixel can be rotated along with the quadratic curve; calculating color coordinates of the first point, the first point being an intersection point between the quadratic curve and a straight line passing through the origin of the color coordinate system and a point where the input pixel currently resides (after being rotated); and calculating the distance between the origin of the color coordinate system and the first point.

According to another aspect of the present invention, there is provided media including computer readable code implementing embodiments of the present invention.

According to another aspect of the present invention, there is provided a color temperature conversion apparatus, having a plurality of storage units, that controls the color temperature of an image display device by comparing a user-set color temperature and each of a plurality of basic color temperatures provided by the image display device and then compensates for the color temperature of an input pixel based on the comparison results. The color temperature conversion apparatus includes: a determination unit, which determines whether the input pixel is to be color-temperature-converted; a comparison unit, which compares the user-set color temperature with a basic color temperature of the image display device to obtain a pair of color coordinates of a target point; a color coordinate calculation unit, which calculates color coordinates of a target point based on either the user-set color temperature or the basic color temperature of the image display device depending on whether the user-set color temperature is the same as the basic color temperature of the image display device; and a color coordinate conversion unit, which converts the color temperature of the input pixel by moving the reference point of the conversion range to the target point so that the input pixel can be automatically moved along with the reference point of the conversion range.

The determination unit may include: a first storage unit, which stores first information including a brightness scaling factor and adjustment factors for variables for determining the conversion range; a first calculator, which reads the first information from the first storage unit and then obtains second information based on the first information; and a determiner, which receives the second information from the first calculator and then determines whether the input pixel is to be color-temperature-converted by determining, based on the second information, whether the input pixel is within the conversion range.

If the conversion range is an oval, the first information may include at least the brightness scaling factor and an adjustment factor for the length of the major axis of the oval, an adjustment factor for the minor axis of the oval, the angle of the major axis of the oval with the X-axis of the color coordinate system.

If the conversion range is oval, the second information may include at least a basic length of the oval, the lengths of the major and minor axes of the oval, and coefficients for a rotation matrix.

The color temperature calculation unit may include: a second storage unit, which stores a plurality of basic color temperatures for each brightness and the respective pairs of color coordinates; and a second calculator, which calculates the color coordinates of the target point, based on the user-set color temperature, through interpolation by using four pairs of sample color coordinates corresponding to combinations of the user-set color temperature and two sample brightnesses selected from the second storage unit.

The color coordinate calculation unit may include: a third storage unit, which stores one basic color temperature and pairs of color coordinates respectively corresponding to the basic brightnesses; and a third calculator, which calculates the color coordinates of the target point, based on the corresponding basic color temperature, through interpolation using two pairs of sample color coordinates corresponding to combinations of the corresponding basic color temperature and two sample brightnesses selected from the third storage unit.

According to another aspect of the present invention, there is provided a color temperature conversion apparatus, which receives an image signal including pixels, each having a brightness signal and color difference signals, receives a user-set color temperature and converts the color temperature of an input pixel to match the user-set color temperature based on the brightness of the input pixel. The color temperature conversion apparatus includes: a first storage unit, which stores first information regarding a conversion range for each brightness; a determination unit, which receives the image signal, reads the first information from the first storage unit and determines whether the input pixel is to be color-temperature-converted by determining, based on the first information, whether the color difference signals of the input pixel are within the conversion range; a second storage unit, which stores a plurality of sample color temperatures and the respective pairs of sample color coordinates as second information; and a color temperature conversion unit, which if the input pixel is to be color-temperature-converted, calculates color coordinates of a target point based on the second information (stored in the second storage unit) and converts the color temperature of the input pixel by moving in the same direction as the reference point to the target point in an amount proportional to the reference point displacement so that the input pixel can be automatically moved along with the reference point of the conversion range.

If the conversion range is an oval, the first information may include the lengths of the major and minor axes of the oval, and coefficients for a rotation matrix.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
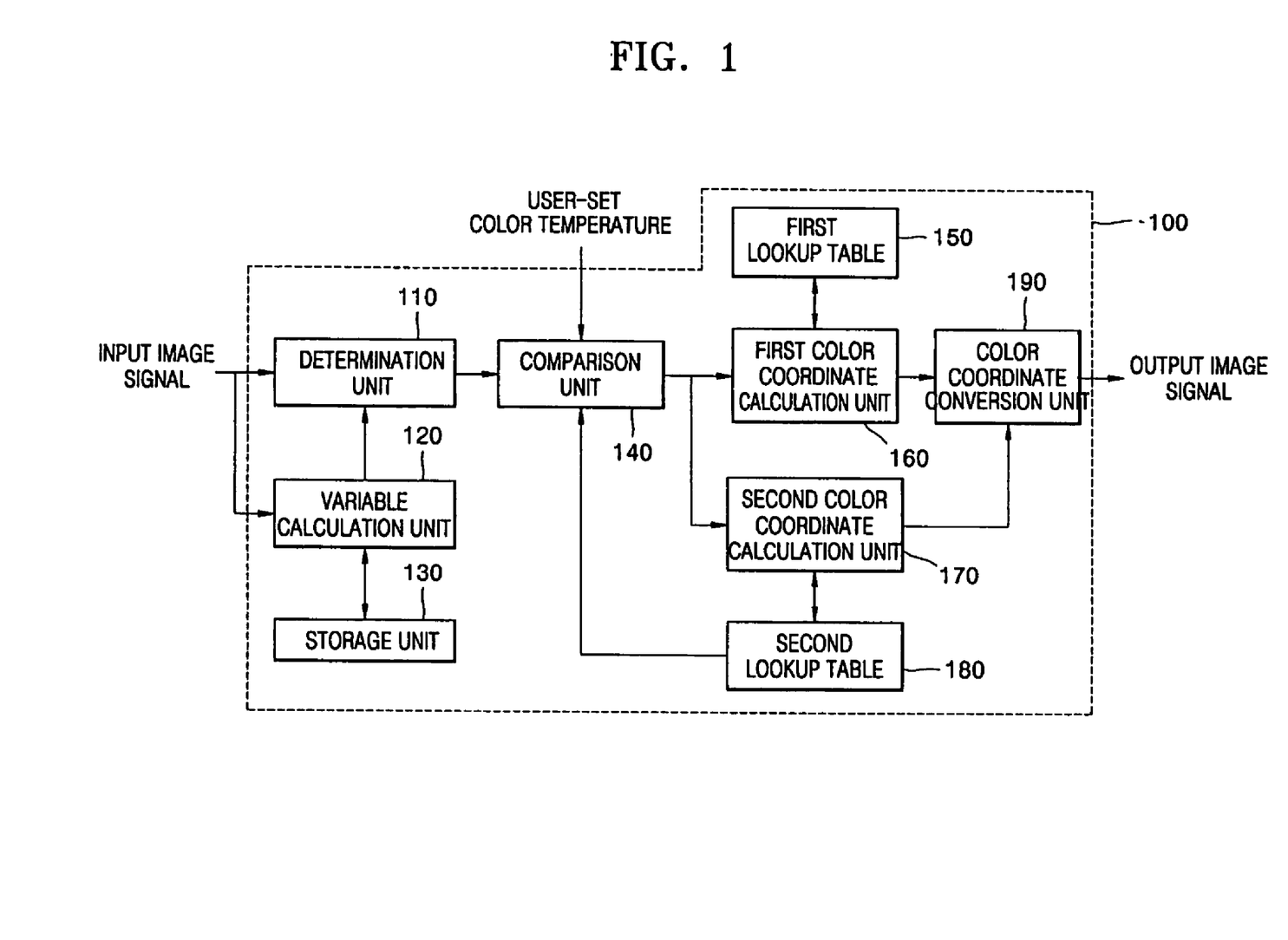
FIG. 1 is a block diagram of a color temperature conversion apparatus, according to an embodiment of the present invention.

FIG. 1 is a block diagram of a color temperature conversion apparatus 100, according to an embodiment of the present invention. Referring to FIG. 1, the color temperature conversion apparatus 100 includes a determination unit 110, a variable calculation unit 120, a storage unit 130, a comparison unit 140, a first lookup table 150, a first color coordinate calculation unit 160, a second color coordinate calculation unit 170, a second lookup table 180, and a color coordinate conversion unit 190.

The determination unit 110 receives an image signal, which includes pixels, and variables (hereinafter referred to as conversion range determining variables) for determining a conversion range from the variable calculation unit 120. The determination unit 110 determines whether a current pixel of the image signal is within the conversion range. That is, using the conversion range determining variables to determine whether the color temperature of the current pixel needs to be converted. Here, each of the pixels of the image signal includes a brightness signal Y and color difference signals Cb and Cr. In addition, the conversion range may be realized as any quadratic curve, in particular, an oval whose center falls on the origin of a color coordinate system. The conversion range realized as an oval in the color coordinate system will be further described below.

The variable calculation unit 120 receives the image signal from an external apparatus, receives predetermined information from the storage unit 130, determines the conversion range determining variables by using the predetermined information, and outputs the determination results to the determination unit 110.

The storage unit 130 stores various adjustment factors, such as the conversion range determining variables, and outputs the various adjustment factors to the variable calculator 120.

The comparison unit 140 receives a color temperature set by a user (hereinafter referred to as a user-set color temperature) and a plurality of basic color temperatures and then compares the user-set color temperature with each of the plurality of basic color temperatures. Here, the plurality of basic color temperatures are a set of color temperatures provided by the image display device. The first color coordinate calculation unit 160 or the second color coordinate calculation unit 170 is selectively used depending on the comparison results. That is, depending on whether there is a match for the user-set color temperature among the plurality of basic color temperatures one of the first color coordinate calculation 160 or the second color coordinate calculation unit 170 will be used.

The first lookup table 150 stores the plurality of basic color temperatures and a plurality of basic brightnesses provided by the image display device, and pairs of sample color coordinates corresponding to combinations of the plurality of basic color temperatures and the plurality of basic brightnesses.

The first color coordinate calculation unit 160 calculates color coordinates of a target point, to which a reference point of the conversion range, for example, the center of the conversion range, is to be moved, based on the user-set color temperature, one of the plurality of basic color temperatures, which is the match for the user-set color temperature with reference to the first lookup table 150.

The second color coordinate calculation unit 170 calculates color coordinates of another target point, to which a reference point of the conversion range, for example, the center of the conversion range, is to be moved, based on the basic color temperature per brightness with reference to the second lookup table 180.

The second lookup table 180 stores pairs of sample color coordinates corresponding to combinations of one of the plurality of basic color temperatures and the plurality of basic brightnesses.

If the current pixel belongs to the conversion range, the color coordinate conversion unit 190 converts the color temperature of the current pixel by moving the center of the conversion range to one of the target points so that the conversion range and pixels contained therein, including the current pixel, can be automatically moved along with the center of the conversion range.

Figure 2:
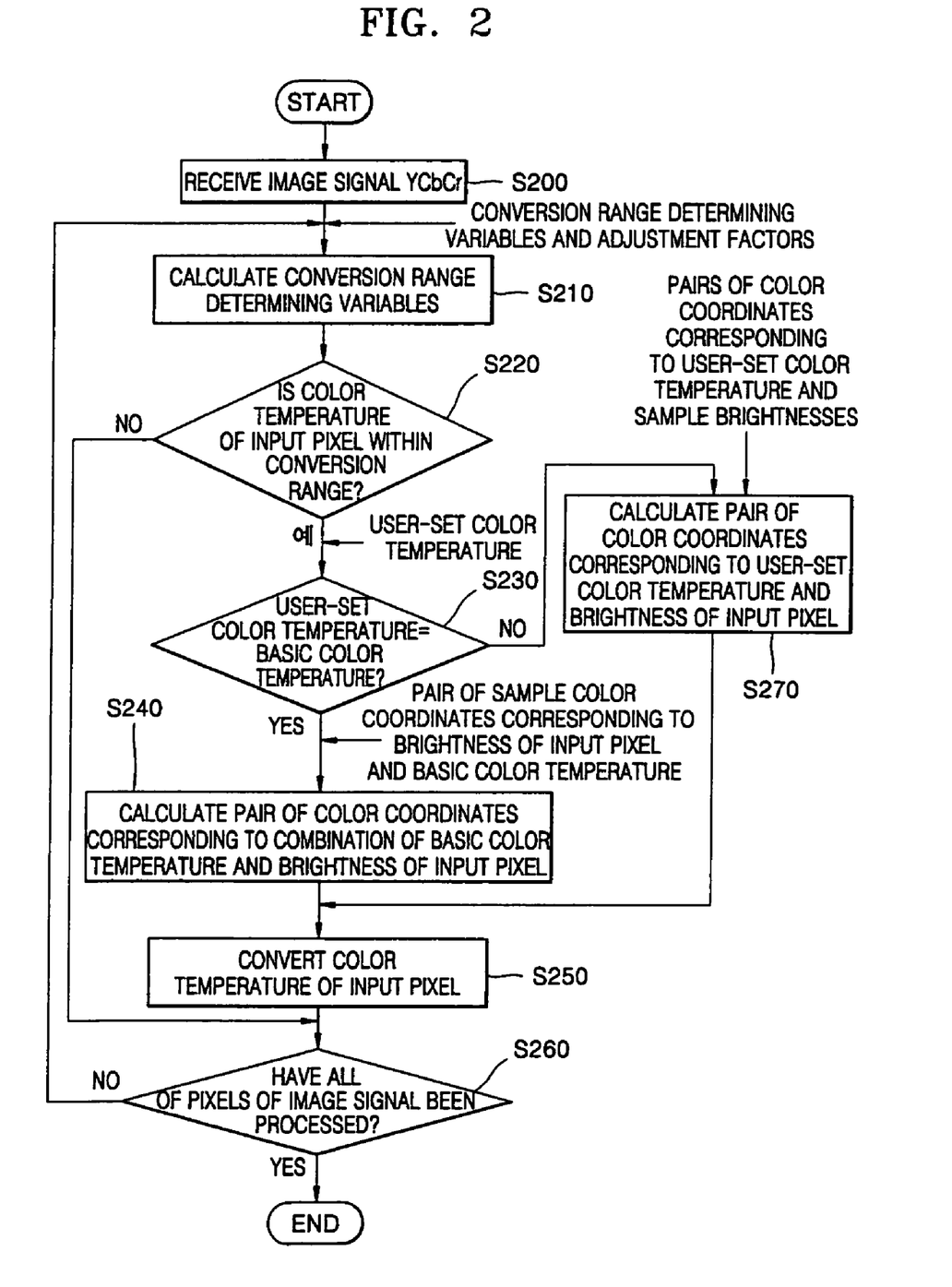
FIG. 2 is a flowchart of a color temperature conversion method, according to an embodiment of the present invention.

FIG. 2 is a flowchart of a color temperature conversion method according to an embodiment of the present invention.

Referring to FIGS. 1 and 2, in operation S200, an image signal is received from outside the color temperature conversion apparatus 100. The image signal includes a plurality of pixels, and each of the pixels has a brightness signal Y and color difference signals Cb and Cr. In operation S210, the variable calculation unit 120 receives predetermined information from the storage unit 130 and determines conversion range determining variables using the predetermined information. The storage unit 130 stores various adjustment factors for determining conversion range determining variables, for example, adjustment factors for the lengths of major and minor axes of an oval, the angle of the major axis of the oval relative to a corresponding X axis of the color coordinate system, and a brightness scaling factor. Adjustment factors are shown in Table 1.

TABLE 1

| Index | Adjustment factors | Constants |
|---|---|---|
| 1 | Adjustment factor for length of major axis of oval | α |
| 2 | Adjustment factor for length of minor axis of oval | β |
| 3 | Angle of major axis of oval with X-axis | θ |
| 4 | Brightness scaling factor | K |

Operation S210 will now be described in greater detail in the following.

Fist, a basic length Base_Dist of the oval is calculated by using Equation (1):

$$\text{Base\_Dist} = k \times Y \quad (1),$$

where k denotes a constant, and Y denotes the brightness of the current pixel.

Second, the length a of the major axis of the oval is calculated by using Equation (2):

$$a = \alpha \times \text{Base\_Dist} \quad (2),$$

where α denotes a constant.

Third, the length b of the minor axis of the oval is calculated by using Equation (3):

$$b = \beta \times a \quad (3),$$

where β denotes a constant for determining b.

Next, coefficients $m_1$ and $m_2$ of a rotation matrix are determined by using the angle θ of the major axis of the oval with the X-axis of the color coordinate system, which is expressed by Equations (4) and (5):

$$m_1 = \cos(-\theta) \quad (4)$$

$$m_2 = \sin(-\theta) \quad (5)$$

Fifthly, a variable f that is an inverse square of the length of the major axis of the oval, is calculated by using Equation (6):

$$f = \frac{1}{a^2} \quad (6)$$

Finally, g, which is an inverse square of the length of the minor axis of the oval, is calculated by using Equation (7) below:

$$g = \frac{1}{b^2} \quad (7)$$

In operation S220, the determination unit 110 determines whether the current pixel is within the conversion range using the conversion range determining variables. Operation S220 will be described in further detail in the following.

First, the image signal is received, and pixels of the image signal are processed. Next, the conversion range determining variables $m_1$, $m_2$, f, and g are received from the variable calculation unit 120 where they are calculated. Then, supposing P(x, y) denotes a current location of the current pixel on the color coordinate system, and $P_1(p_{1x}, p_{1y})$ denotes a rotated location, color coordinates $p_{1x}$ and $p_{1y}$ are respectively obtained by using Equations (8) and (9):

$$p_{1x} = m_1 \times x - m_2 \times y \quad (8)$$

$$p_{1y} = m_2 \times x - m_1 \times y \quad (9)$$

Finally, it is determined whether the current pixel is within the conversion range or not. That is, whether the color temperature of the current pixel needs to be converted, using Inequality (10). In other words, if the current pixel satisfies Inequality (10), then the current pixel is within the conversion range. Otherwise, the current pixel is determined as being beyond the conversion range, and the color temperature conversion of the current pixel is complete. Thereafter, another round of color temperature conversion can be performed on a subsequent pixel.

$$f \times p_{1x} + g \times p_{1y} \leq 1 \quad (10)$$

In operation S230, the comparison unit 140 receives a user-set color temperature $T_u$ and one of a plurality of basic color temperatures provided by the image display device; for example, a basic color temperature $T_w$. The comparison unit 140 then compares the user-set color temperature $T_u$ with the basic color temperature $T_w$. The user-set color temperature $T_u$ is input to the comparison unit 140 from the outside of the color temperature conversion apparatus 100, and the plurality of basic color temperatures are stored in a predetermined portion (e.g., a storage unit) of the color temperature conversion apparatus 100. The plurality of basic color temperatures may be stored in the second lookup table 180.

In operation S270, if the user-set color temperature $T_u$ and the basic color temperature $T_w$ are different, color temperature conversion is performed on the current pixel based on the user-set color temperature $T_u$.

Conversely, in operation S240, if the user-set color temperature $T_u$ and the basic color temperature $T_w$ are the same, color temperature conversion is performed on the current pixel based on the basic color temperature $T_w$.

In operation S270, the first color coordinate calculation unit 170 calculates color coordinates (hereinafter referred to as target color coordinates) of a target point, to which the center of the conversion range is to be moved, based on the brightness signal and color difference signals of the current pixel, with reference to the first lookup table 150. Table 2 is an example of the first lookup table 150.

TABLE 2

| Index | Brightness | $T_1$ | $T_2$ | ... | $T_{M-1}$ | $T_M$ |
|---|---|---|---|---|---|---|
| 1 | $Y_1$ | $Cb_{1\_T1}, Cr_{1\_T1}$ | $Cb_{1\_T2}, Cr_{1\_T2}$ | ... | $Cb_{1\_TM-1}, Cr_{1\_TM-1}$ | $Cb_{1\_TM}, Cr_{1\_TM}$ |
| 2 | $Y_2$ | $Cb_{2\_T1}, Cr_{2\_T1}$ | $Cb_{2\_T2}, Cr_{2\_T2}$ | ... | $Cb_{2\_TM-1}, Cr_{2\_TM-1}$ | $Cb_{2\_TM}, Cr_{2\_TM}$ |
| 3 | $Y_3$ | $Cb_{3\_T1}, Cr_{3\_T1}$ | $Cb_{3\_T2}, Cr_{3\_T2}$ | ... | $Cb_{3\_TM-1}, Cr_{3\_TM-1}$ | $Cb_{3\_TM}, Cr_{3\_TM}$ |
| 4 | $Y_4$ | $Cb_{4\_T1}, Cr_{4\_T1}$ | $Cb_{4\_T2}, Cr_{4\_T2}$ | ... | $Cb_{4\_TM-1}, Cr_{4\_TM-1}$ | $Cb_{4\_TM}, Cr_{4\_TM}$ |
| ... | ... | ... | ... | ... | ... | ... |
| N − 1 | $Y_{N-1}$ | $Cb_{N-1\_T1}, Cr_{N-1\_T1}$ | $Cb_{N-1\_T2}, Cr_{N-1\_T2}$ | ... | $Cb_{N-1\_TM-1}, Cr_{N-1\_TM-1}$ | $Cb_{N-1\_TM}, Cr_{N-1\_TM}$ |
| N | $Y_N$ | $Cb_{N\_T1}, Cr_{N\_T1}$ | $Cb_{N\_T2}, Cr_{N\_T2}$ | ... | $Cb_{N\_TM-1}, Cr_{N\_TM-1}$ | $Cb_{N\_TM}, Cr_{N\_TM}$ |

The calculation of the target color coordinates will be described in further detail with reference to Table 2 in the following.

First, suppose that the current pixel has a brightness Y. Two sample brightness signals $Y_l$ and $Y_h$, which satisfy Inequality 11 below, are selected from among a plurality of sample brightness signals provided by the first lookup table 150.

$$Y_l < Y \leq Y_h \quad (11)$$

Among the plurality of sample brightnesses, each pair of two consecutive brightnesses have a predetermined difference, and each of the plurality of sample brightnesses has a fixed value. If the plurality of sample brightnesses are 8-bit data, they may have a value between 0 and 255. For example, the first lookup table 150 may have a total of 16 sample brightness signals (N=16) with each pair of consecutive sample brightnesses having a difference of 16. If the 16 sample brightness signals are 0, 16, 32, 48, 64, 80, . . . , 240, and the brightness signal Y of the current pixel is 37, then the two selected sample brightness signals $Y_l$ and $Y_h$ are 32 and 48, respectively.

Next, two sample color temperatures that satisfy Inequality (12) are selected from among a plurality of sample color temperatures provided by the first lookup table 150.

$$T_l < T_u \leq T_h \quad (12)$$

Figure 3:
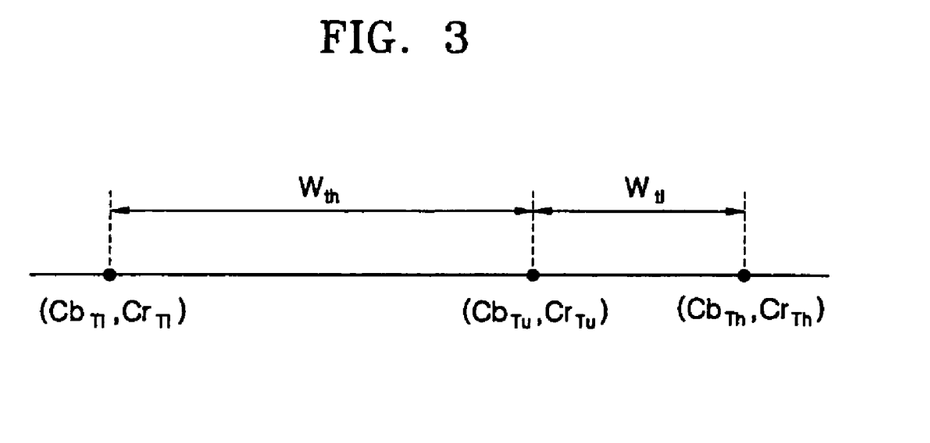
FIG. 3 is a diagram illustrating color temperature-based interpolation of target color coordinates between pairs of sample color coordinates.

Next, if the brightness Y of the current pixel is the same as one of the plurality of sample brightnesses, then there is no need to obtain the brightness of the current pixel through interpolation. The interpolation requires the two sample brightnesses $Y_l$ and $Y_h$, pairs of sample color coordinates $(Cb_{Tl}, Cr_{Tl})$ and $(Cb_{Th}, Cr_{Th})$, respectively corresponding to combinations of the brightness Y of the current pixel and the selected sample color temperatures $T_l$ and $T_h$ (obtained from the first lookup table 150). Thereafter, target color coordinates $(Cb_{Tu}, Cr_{Tu})$, corresponding to a combination of the user-set color temperature $T_u$ and the brightness Y of the current pixel, are obtained through interpolation involving the pairs of sample color coordinates $(Cb_{Tl}, Cr_{Tl})$ and $(Cb_{Th}, Cr_{Th})$ and weight values $W_{tl}$ and $W_{th}$. The weight values $W_{tl}$ and $W_{th}$ are calculated by taking the differences between $T_u$ and $T_l$ and between $T_u$ and $T_h$, which is expressed by Equations (13) and (14). The target color coordinates $Cb_{Tu}$ and $Cr_{Tu}$ are obtained by using Equations (15) and (16), respectively. FIG. 3 illustrates such color temperature-based interpolation of the target color coordinates $(Cb_{Tu}, Cr_{Tu})$ between the two pairs of sample color coordinates $(Cb_{Tl}, Cr_{Tl})$ and $(Cb_{Th}, Cr_{Th})$.

$$W_{tl} = \frac{T_h - T_u}{T_h - T_l} \quad (13)$$

$$W_{th} = \frac{T_u - T_l}{T_h - T_l} \quad (14)$$

$$Cb_{Tu} = W_{tl} \times Cb_{Tl} + W_{th} \times Cb_{Th} \quad (15)$$

$$Cr_{Tu} = W_{tl} \times Cr_{Tl} + W_{th} \times Cr_{Th} \quad (16)$$

Figure 4:
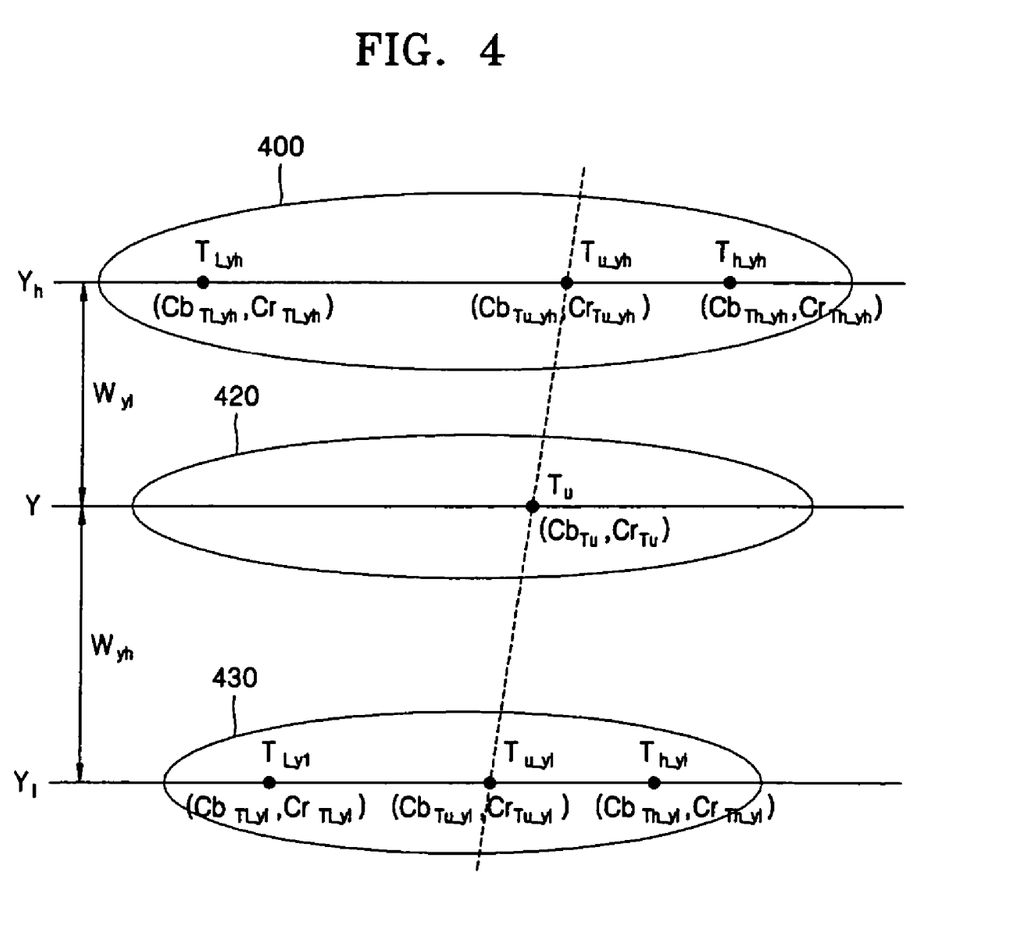
FIG. 4 is a diagram illustrating pixel brightness-based interpolation of the target color coordinates between pairs of sample color coordinates.

However, if the brightness Y of the current pixel is not the same as any of the plurality of sample brightnesses, and thus here there is a need to obtain the brightness of the current pixel through interpolation. The interpolation involves the two sample brightnesses $Y_l$ and $Y_h$, pairs of sample color coordinates $(Cb_{Tu\_yl}, Cr_{Tu\_yl})$, corresponding to a combination of the user-set color temperature $T_u$ and the sample brightness $Y_l$, and $(Cb_{Tu\_yh}, Cr_{Tu\_yh})$, corresponding to a combination of the user-set color temperature $T_u$ and the sample brightness $Y_h$, and weight values $W_{yl}$ and $W_{yh}$. The weight values $W_{yl}$ and $W_{yh}$ are obtained by taking the differences between Y and $Y_l$ and between Y and $Y_h$, which is expressed by Equations (17) and (18), respectively. The target color coordinates $Cb_{Tu}$ and $Cr_{Tu}$ are obtained by using Equations (19) and (20), respectively. The interpolation of the target color coordinates $(Cb_{Tu}, Cr_{Tu})$ between $(Cb_{Tu\_l}, Cr_{Tu\_l})$ and $(Cb_{Tu\_h}, Cr_{Tu\_h})$ is illustrated in FIG. 4.

$$W_{yl} = \frac{Y_h - Y}{Y_h - Y_l} \quad (17)$$

$$W_{yh} = \frac{Y - Y_l}{Y_h - Y_l} \quad (18)$$

$$Cb_{Tu} = W_{yl} \times CbT_{u\_yl} + W_{yh} \times CbT_{u\_yh} \quad (19)$$

$$Cr_{Tu} = W_{yl} \times CrT_{u\_yl} + W_{yh} \times CrT_{u\_yh} \quad (20)$$

In operation S240, the second color coordinate calculation unit 170 calculates the target color coordinates based on the brightness signal and color difference signals of the current pixel, with reference to the second lookup table 180.

Table 3 shows an example of the second lookup table 180.

TABLE 3

| Index | Brightness | Color coordinates |
|---|---|---|
| 1 | $Y_1$ | $Cb_{1\_DT}, C_{1\_DT}$ |
| 2 | $Y_2$ | $Cb_{2\_DT}, Cr_{2\_DT}$ |
| 3 | $Y_3$ | $Cb_{3\_DT}, Cr_{3\_DT}$ |
| 4 | $Y_4$ | $Cb_{4\_DT}, Cr_{4\_DT}$ |
| ... | ... | ... |
| N − 1 | $Y_{N-1}$ | $Cb_{N-1\_DT}, Cr_{N-1\_DT}$ |
| N | $Y_N$ | $Cb_{N\_DT}, Cr_{N\_DT}$ |
| N + 1 | $Y_{N+1}$ | Basic color temperature |

The operation of calculating the target color coordinates will be described in greater detail in the following.

First, two sample brightness signals $Y_{l\_dt}, Y_{h\_dt}$, which satisfy Inequality 21, are searched for in the second lookup table 180.

$$Y_{l\_dt} < Y \leq Y_{h\_dt} \quad (21)$$

Each of the sample brightness signals $Y_{l\_dt}, Y_{h\_dt}$ has a fixed value. If the two sample brightnesses $Y_{l\_dt}$ and $Y_{h\_dt}$ are 8-bit data, they have a value between 0 and 255. For example, the second lookup table 180 may store a total of 16 sample brightness signals (N=16) with each pair of consecutive sample brightnesses having a difference of 16. In addition, the 16 sample brightnesses may be, for example, 0, 16, 32, 48, 64, 80, . . . , 240. If the brightness Y of the current pixel has a value of 37, 32 and 48 are selected as the sample brightness signals $Y_{l\_dt}$ and $Y_{h\_dt}$, respectively.

Next, weight values $W_{yl\_dt}$ and $W_{yh\_dt}$ are obtained by taking the differences between the brightness Y of the current pixel and the sample brightness $Y_{l\_dt}$ and between the brightness Y of the current pixel and the sample brightness $Y_{h\_dt}$. Then, the target color coordinates $(C_{bTu}, C_{rTu})$ are obtained through interpolation by using the Weight values $W_{yl\_dt}$ and $W_{yh\_dt}$. Specifically, the weight values $W_{yl\_dt}$ and $W_{yh\_dt}$ are calculated by using Equations (22) and (23) below, respectively, and the target color coordinates $(C_{bTu}, C_{rTu})$ are calculated by using Equations (24) and (25).

$$W_{yl\_dt} = \frac{Y_{h\_dt} - Y}{T_{h\_dh} - T_{l\_dt}} \quad (22)$$

$$W_{yh\_dt} = \frac{Y - Y_{l\_dt}}{T_{h\_dh} - T_{l\_dt}} \quad (23)$$

$$Cb_{Tu} = W_{yl\_dt} \times Cb_{Tu\_yl} + W_{yh\_dt} \times Cb_{Tu\_yh} \quad (24)$$

$$Cr_{Tu} = W_{yl\_dt} \times Cr_{Tu\_yl} + W_{yh\_dt} \times Cr_{Tu\_yh} \quad (25)$$

If the second lookup table 180 stores all brightness levels provided by the image display device (brightness levels corresponding to values from 0 to 255, if each of the brightness levels is represented as 8-bit data) and their respective pairs of sample color coordinates, the pairs of sample color coordinates, corresponding to the brightness levels, can be easily obtained by referring to the second lookup table 180. Thus, the color temperature conversion apparatus does not need to calculate the weight values $W_{yl\_dt}$ and $W_{yh\_dt}$ and then perform an interpolation process to obtain the target color coordinates ($Cb_{Tu}$, $Cr_{Tu}$). In order to store all of the brightness levels provided by the image display device and their respective pairs of sample color coordinates, the color temperature conversion apparatus should contain an additional storage space.

Referring back to FIG. 2, in operation S250, the color coordinate conversion unit 190 performs color temperature conversion on the current pixel by moving the center of the conversion range to the target point. Operation S250 will be described in further detail in the following.

First, it is determined whether both color coordinates x and y of a point P, at which the current pixel currently resides, have a value of 0. If both of the color coordinates x and y have a value of 0 (if x=y=0), color coordinates x' and y' of a P', to which the current pixel is to be automatically moved along with the center of the conversion range, are simply replaced with the respective target color coordinates $T_u(Cb_{Tu}, Cr_{Tu})$. In other words, $x'=Cb_{Tu}$, and $y'=Cr_{Tu}$. Thereafter, the color conversion process for the current pixel is complete without the need to perform additional processes on the current pixel. Then, another round of color conversion is performed on a subsequent pixel.

Next, when the color coordinates x and y are not zero, a distance r between the center of the conversion range and a point on the boundary of the conversion range, at which a predetermined straight line drawn from the center of the conversion range through a point $P_1(p_{1x}, p_{1y})$ terminates, is calculated using Equation (26):

$$r = \sqrt{x_c^2 + y_c^2} = \sqrt{\frac{1+B^2}{f+gB^2}}, \qquad (26)$$

where B is the slope of the predetermined straight line, defined by:

$$B = \frac{p_1 y}{p_1 x},$$

and ($x_c$, $y_c$) denotes a pair of color coordinates of an intersection point between the predetermined straight line and the conversion range. Here, the predetermined straight line can be represented by the following equation: y=Bx. If $p_1x=0$ and $p_1y \neq 0$, $$r = \frac{1}{g}.$$

If $p_1y=0$ and $p_1x \neq 0$, $$r = \frac{1}{f}.$$

Next, a weight $W_m$ is calculated by using Equation (27) below:

$$W_m = \frac{r - \|P\|}{r} = \frac{r - \sqrt{x^2 + y^2}}{r}, \qquad (27)$$

where P denotes the point at which the current pixel currently resides.

Next, the color coordinates x' and y' of the point P', to which the current pixel is to be moved from P after the color temperature of the current pixel is converted, are calculated by using Equation (28):

$$P' = \begin{pmatrix} x' \\ y' \end{pmatrix} = \begin{pmatrix} x \\ y \end{pmatrix} + W_m \times \begin{pmatrix} x_t \\ y_t \end{pmatrix}, \qquad (28)$$

where $x_t$ and $y_t$ are the target color coordinates $Cb_{Tu}$ and $Cr_{Tu}$ obtained in operation S250.

In operation S260, it is determined whether all of the pixels of the image signal have gone through the previously described operations; that is, operations S200 through S250. If all of the pixels of the image signal have already been processed, the color temperature conversion method is complete. Otherwise, operations S200 through S250 are repeated until no pixels of the image signal are left unprocessed.

Figure 5:
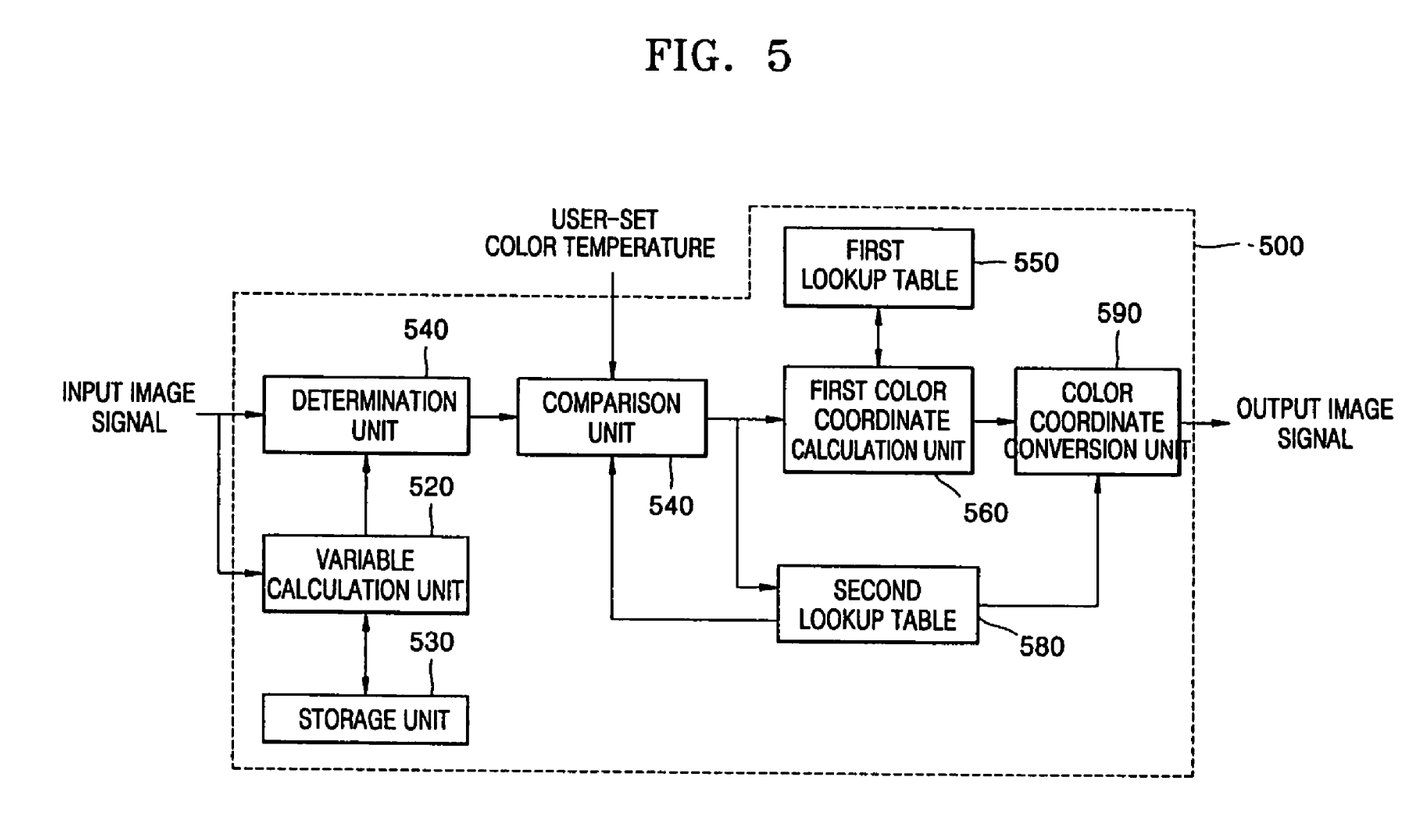
FIG. 5 is a block diagram of a color temperature conversion apparatus, according to another embodiment of the present invention.

FIG. 5 is a block diagram of a color temperature conversion apparatus 500 according to another embodiment of the present invention. Referring to FIG. 5, the color temperature conversion apparatus 500 includes a conversion range determination unit 510, a variable calculation unit 520, a storage unit 530, a comparison unit 540, a first lookup table 550, a color coordinate calculation unit 560, a second lookup table 580, and a color coordinate conversion unit 590.

The color temperature conversion apparatus 500 is similar to the color temperature conversion unit 100 except that the color temperature conversion apparatus 500 does not need the second color coordinate calculation unit 180. Since the color temperature conversion apparatus 500 does not need the second color coordinate calculation unit 180, the second lookup table 180 needs to store as many pairs of sample color coordinates as possible. In other words, the second lookup table 180 needs to store all possible pixel brightnesses and the respective pairs of color coordinates.

Figure 6:
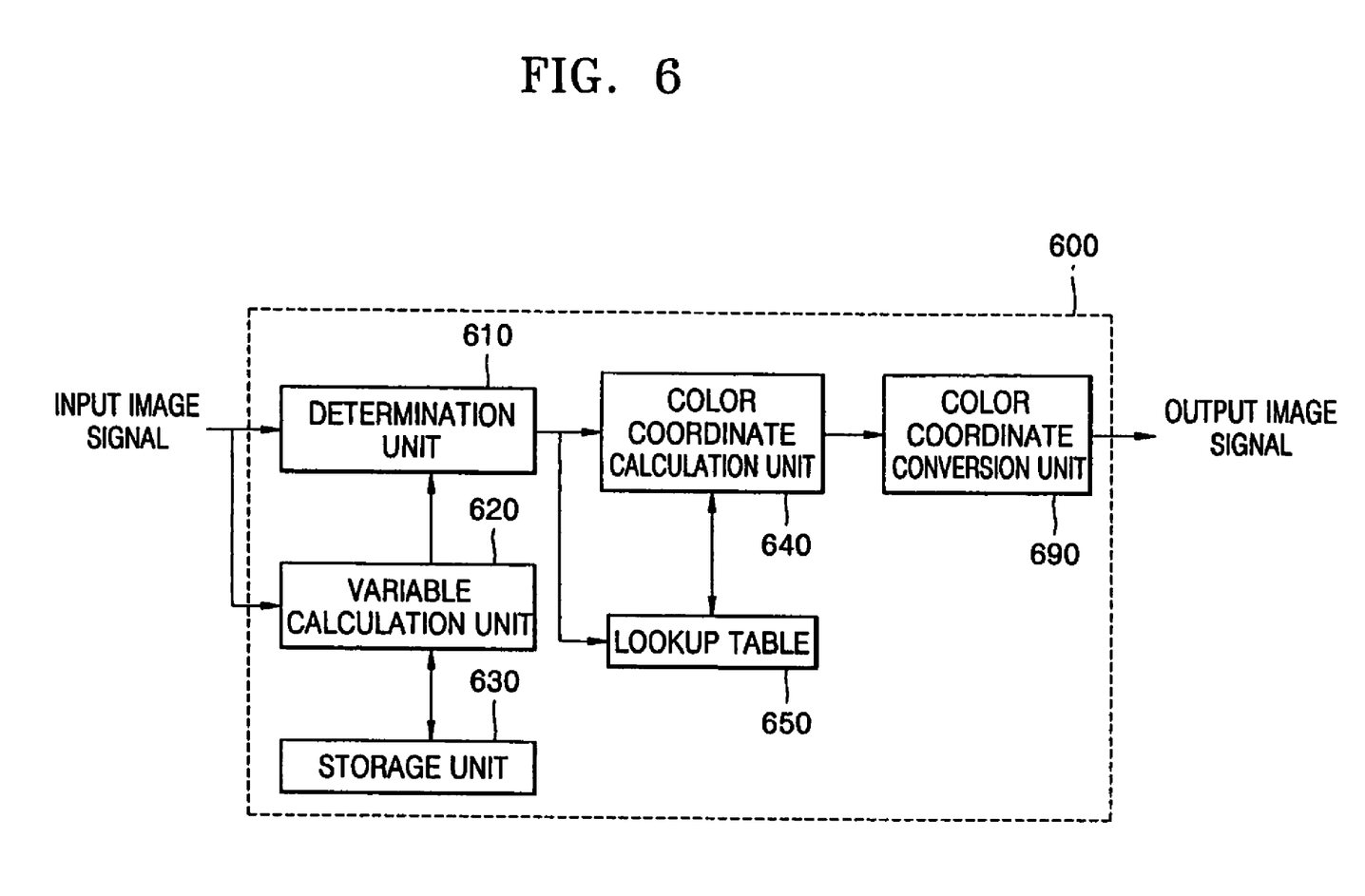
FIG. 6 is a block diagram of a color temperature conversion apparatus, according to still another embodiment of the present invention.

FIG. 6 is a block diagram of a color temperature conversion apparatus 600, according to still another embodiment of the present invention. Referring to FIG. 6, the color temperature conversion apparatus 600 includes elements similar to the color temperature conversion apparatus 100 except for the comparison unit 140, the first lookup table 150, and the first color coordinate calculation unit 160. In other words, the color temperature conversion apparatus 600 includes a determination unit 610, a variable calculation unit 620, a storage unit 630, a color coordinate calculation unit 640, a lookup table 650, and a color coordinate conversion unit 660. The lookup table 650 is the same as the second lookup table 180 except that it does not have a section N+1 concerned with basic color temperatures.

Table 4 below is an example of the lookup table 650.

TABLE 4

| Index | Brightness | Color coordinates |
|---|---|---|
| 1 | $Y_1$ | $Cb_{1\_DT}, Cr_{1\_DT}$ |
| 2 | $Y_2$ | $Cb_{2\_DT}, Cr_{2\_DT}$ |
| 3 | $Y_3$ | $Cb_{3\_DT}, Cr_{3\_DT}$ |
| 4 | $Y_4$ | $CD_{4\_DT}, Cr_{4\_DT}$ |
| ... | ... | ... |
| N − 1 | $Y_{N-1}$ | $Cb_{N-1\_DT}, Cr_{N-1\_DT}$ |
| N | $Y_N$ | $Cb_{N\_DT}, Cr_{N\_DT}$ |

Figure 7:
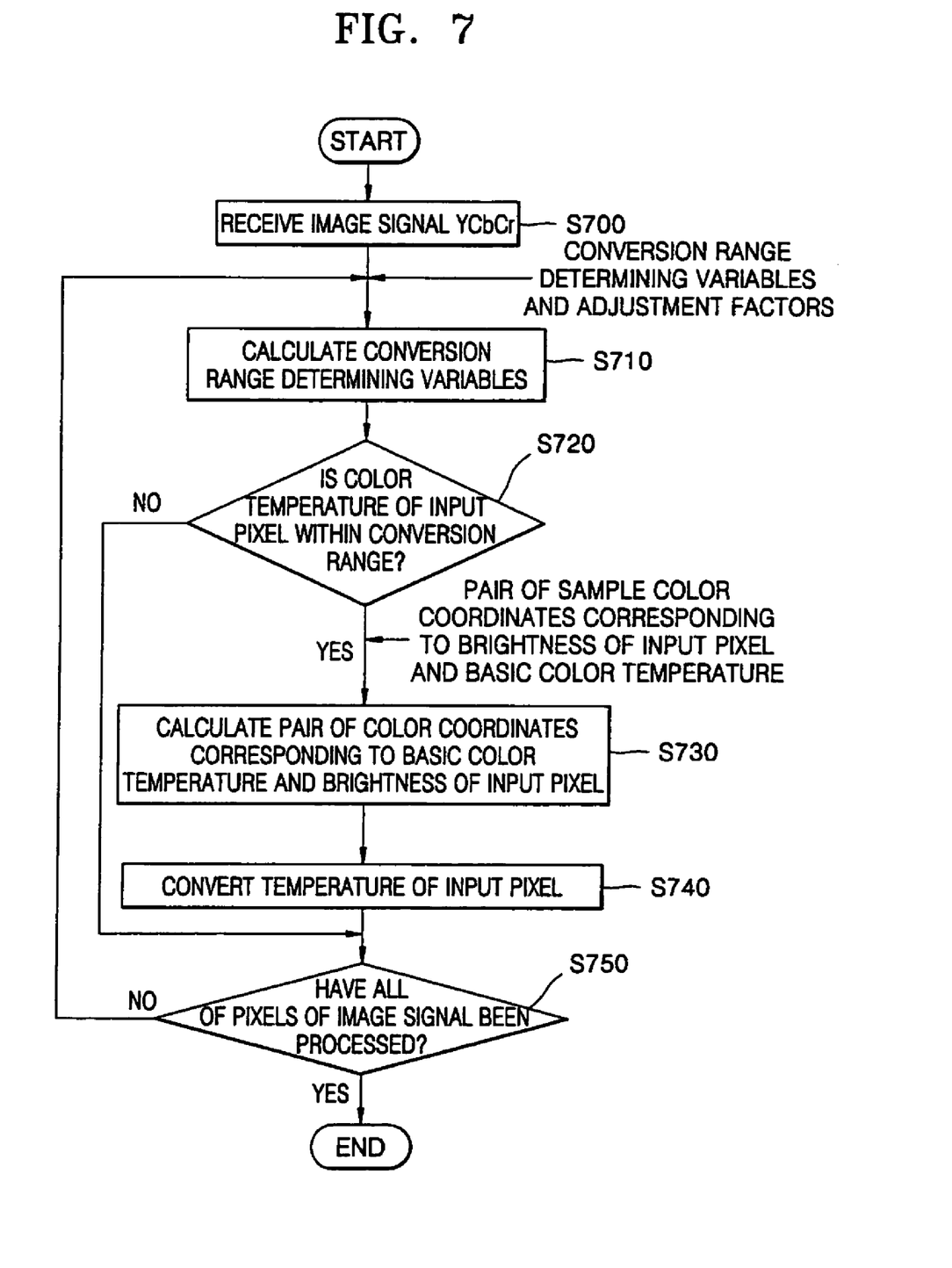
FIG. 7 is a flowchart of a color temperature conversion method for the color temperature conversion apparatus of FIG. 6.

FIG. 7 is a flowchart of a color temperature conversion method, according to another embodiment of the present invention. Specifically, FIG. 7 is a flowchart of a color temperature conversion method performed by the color temperature conversion apparatus 600 of FIG. 6. Referring to FIG. 7, the color temperature conversion method involves calculating conversion range determining variables in operation S710, determining whether an input pixel is within a conversion range in operation S720, calculating color coordinates corresponding to the brightness of the input pixel in operation S730, and converting the color temperature of the input pixel in operation S740.

The color temperature conversion method of FIG. 7 is very similar to that of FIG. 2. However, the color temperature conversion method of FIG. 7 simply converts the color temperature of the input pixel based on the brightness of the input pixel rather than have a user manually convert the color temperature of the input pixel.

Figure 8:
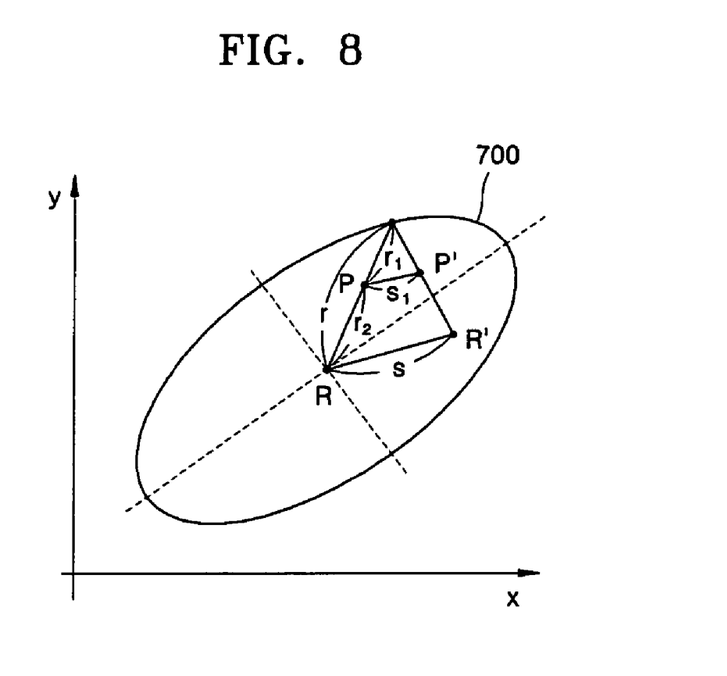
FIG. 8 is a diagram illustrating the relationship between color coordinates of a point, at which a current pixel currently resides, and color coordinates of another point to which the current pixel is to be moved.
Figure 9:
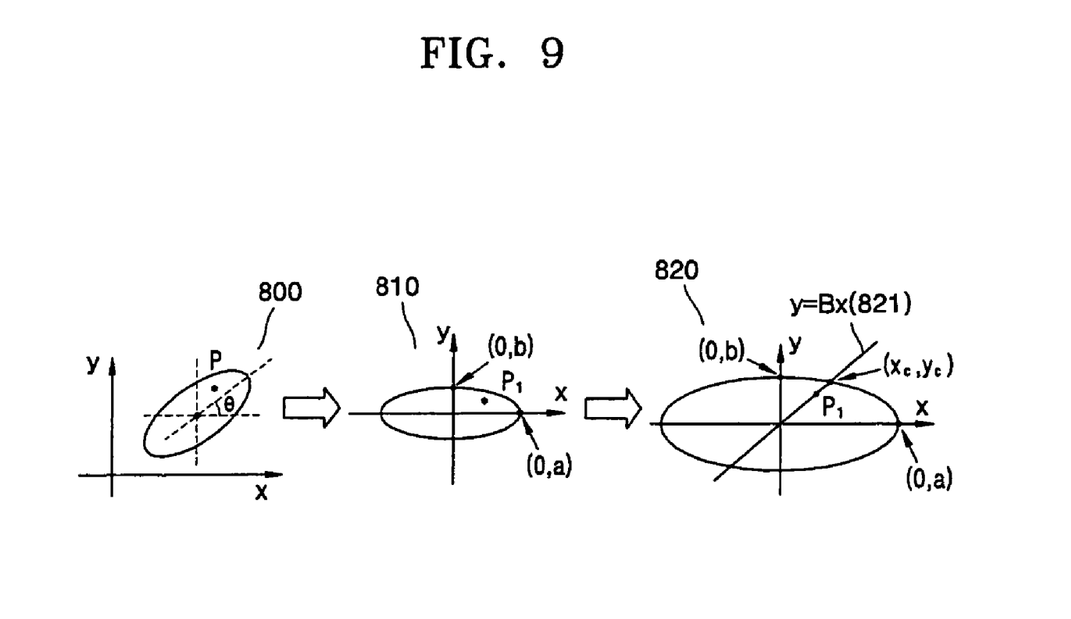
FIG. 9 is a diagram illustrating a process of calculating r of FIG. 8.

FIG. 8 is a diagram illustrating the movement of an input pixel on a color coordinate system as a result of user-set color temperature conversion by using, so called, moving of mass point in ellipse (MMPE). FIG. 9 is a diagram illustrating a process of calculating a distance r from the center R of a conversion range to a point on the boundary of the conversion range, at which a predetermined straight line drawn from the center of the conversion range through a point $P_1(p_{1x}, p_{1y})$ terminates.

A process of obtaining color coordinates of a point P'(x', y') on the color coordinate system, to which the input pixel is to be transferred from a point P(x, y), where it currently resides, will be described in further detail in the following with reference to FIG. 8.

Referring to FIG. 8, if both the point P and a target point R', to which a reference point R of a conversion range 700 is to be transferred after color temperature conversion is performed on the input pixel, exist within the conversion range 700, it is possible to calculate color coordinates of a point P'. P' is the point P is to be automatically moved to when color temperature conversion is performed on the input pixel.

A distance s between the reference point R and the target point R' is obtained by using Equation (29) below:

$$(P'-P)=a(R'-R) \tag{29}$$

Equation (29) can be rearranged to form Equation (30):

$$a = \frac{\|P-P'\|}{\|R-R'\|} = \frac{s_1}{s} = \frac{r_1}{r} \tag{30}$$

where $r=r_1+r_2=r_1+\|P-R\|$. Accordingly, the point P' can be obtained by using Equation (31):

$$P' = P + \frac{r_1}{r}(R'-R) = P + \frac{r-\|P-R\|}{r}(R'-R) \tag{31}$$

As shown in Equation (31), P' is determined by R, R', P, and r. Thus, there is the need to calculate r in order to calculate P'. If the conversion range 700 is circular, r is the radius of the conversion range 700 and thus is always the same, which makes the calculation of P' easier.

Referring to FIG. 9, the center of a conversion range 800, which is oval and is tilted by a predetermined angle θ, is moved to the origin of a color coordinate system (810), so that the major and minor axes of the conversion range 800 are parallel to the X and Y axes, respectively. Then, a distance r between the center of the conversion range 800 and an intersection point $(x_c, Y_c)$ between the boundary of the conversion range and a straight line 821 is calculated (820). The straight line 821, which is expressed by the equation y=Bx, passes through the center of the conversion range 800 and a point $P_1$ which is obtained by rotating P by θ.

The conversion range 800 can be expressed by the following equation: $fx^2+gy^2=1$ where $$f = \frac{1}{a^2}, \text{ and } g = \frac{1}{b^2}.$$

The distance r can be obtained by using Equation (32) below:

$$r = \sqrt{x_c^2 + y_c^2} = \sqrt{\frac{1+B^2}{f+gB^2}} \tag{32}$$

As described above, it is possible to realize any color temperature that a user wants for the brightness of each pixel of an image while minimizing color distortions in the image.

Embodiments of the present invention may be implemented through computer readable coding/instructions in a medium, e.g., a computer-readable medium, including but not limited to storage media such as magnetic storage media (ROMs, RAMs, floppy disks, magnetic tapes, etc.), and optically readable media (CD-ROMs, DVDs, etc.). The present invention may also be embodied as a medium having a computer-readable code embodied therein for causing a number of computer systems connected via a network to effect distributed processing. The functional programs, codes and code segments for embodying the present invention may be easily deducted by programmers in the art which the present invention belongs to in view of the above disclosure.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A color temperature conversion method for a color temperature conversion apparatus, comprising a plurality of storage units, controlling color temperatures of an image display device by comparing a user-set color temperature and each of a plurality of basic color temperatures provided by the image display device and then compensating for a color temperature of an input pixel based on comparison results, the color temperature conversion method comprising:

calculating variables for determining a conversion range, the conversion range being represented by a quadratic curve;

determining whether, based on the calculated variables, the input pixel is to be color-temperature-converted by determining whether the input pixel is within the conversion range;

receiving the user-set color temperature and comparing the user-set color temperature with basic color temperatures of the image display device if the input pixel is to be color-temperature converted;

calculating color coordinates of a target point, based on the user-set color temperature, if there are no matches for the user-set color temperature and the basic color temperatures, and calculating the color coordinates of the target point based on one of the plurality of basic color temperatures, if there is a match with the user-set color temperature and the one basic color temperature; and converting the color temperature of the input pixel by moving the input pixel and a reference point of the conversion range, in a direction same as the reference point to the target point in an amount proportional to a displacement of the reference point, so that the input pixel can be automatically moved along with the reference point of the conversion range.

2. The color temperature conversion method of claim 1, wherein if the quadratic curve is an oval, the calculating of the variables for determining a conversion range comprises:
   calculating a basic length of the oval and lengths of major and minor axes of the oval by referencing a first storage unit; and
   calculating coefficients for a rotation matrix based on an angle of the major axis of the oval, in relation to a corresponding X-axis of the color coordinate system, by referencing the first storage unit.

3. The color temperature conversion method of claim 2, wherein the first storage unit stores an adjustment factor for the length of the major axis of the oval, an adjustment factor for the minor axis of the oval, the angle of the major axis of the oval, and a brightness scaling factor.

4. The color temperature conversion method of claim 1, wherein the calculating of the color coordinates of the target point based on the user-set color temperature comprises:
   searching a second storage unit's plurality of basic brightnesses, provided by the image display device, and obtaining two sample brightnesses that are closest to the input pixel;
   reading from the second storage unit four pairs of sample color coordinates corresponding to combinations of the user-set color temperature and the two sample brightnesses; and
   calculating the color coordinates of the target point through interpolation by using the four pairs of sample color coordinates.

5. The color temperature conversion method of claim 4, wherein the second storage unit stores a plurality of basic color temperatures for each brightness and respective pairs of color coordinates.

6. The color temperature conversion method of claim 1, wherein the calculating of the color coordinates of the target point based on the one basic color temperature comprises:
   searching a third storage unit's plurality of basic brightnesses, provided by the image display device, and obtaining two sample brightnesses that are closest to the input pixel;
   reading two pairs of sample color coordinates corresponding to combinations of the one basic color temperature and the two sample brightnesses; and
   calculating the color coordinates of the target point through interpolation by using the two pairs of sample color coordinates.

7. The color temperature conversion method of claim 6, wherein the third storage unit stores one basic color temperature and pairs of color coordinates corresponding to respective basic brightnesses.

8. The color temperature conversion method of claim 1, wherein, in the calculating of the color coordinates of the target point based on the one basic color temperature, the color coordinates of the target point are obtained from a third storage unit that stores one basic color temperature and pairs of color coordinates corresponding to respective basic brightnesses.

9. The color temperature conversion method of claim 1, wherein the calculating of the color coordinates of a target point based on the user-set color temperature comprises:
   calculating a distance between the quadratic curve and a first point; and
   calculating color coordinates of a point, to which the input pixel is to be automatically moved along with the reference point of the conversion range, by using the distance between the quadratic curve and the first point and the color coordinates of the target point.

10. The color temperature conversion method of claim 9, wherein the calculating of the distance between the quadratic curve and a first point comprises:
    moving the reference point of the quadratic curve to an origin of the color coordinate system;
    rotating the quadratic curve by a predetermined rotation angle by using a rotation matrix so that the input pixel is rotated along with the quadratic curve;
    calculating color coordinates of the first point, the first point being an intersection point between the quadratic curve and a straight line passing through the origin of the color coordinate system and a point where the input pixel resides after being rotated; and
    calculating the distance between the origin of the color coordinate system and the first point.

11. A computer readable storage medium comprising computer readable code to control an implementation of the color temperature conversion method of claim 1.

12. A computer readable storage medium comprising computer readable code to control an implementation of the color temperature conversion method of claim 2.

13. A computer readable storage medium comprising computer readable code to control an implementation of the color temperature conversion method of claim 4.

14. A computer readable storage medium comprising computer readable code to control an implementation of the color temperature conversion method of claim 6.

15. A computer readable storage medium comprising computer readable code to control an implementation of the color temperature conversion method of claim 8.

16. A computer readable storage medium comprising computer readable code to control an implementation of the color temperature conversion method of claim 10.

17. A color temperature conversion apparatus comprising a plurality of storage units to control color temperatures of an image display device by comparing a user-set color temperature and each of a plurality of basic color temperatures provided by the image display device and compensating a color temperature of an input pixel based on the comparison results, the color temperature conversion apparatus comprising:
    a determination unit to determine whether the input pixel is to be color-temperature-converted;
    a comparison unit to compare the user-set color temperature with basic color temperatures of the image display device for obtaining a pair of color coordinates of a target point;
    a color coordinate calculation unit to calculate the color coordinates of the target point based on either the user-set color temperature or at least one of the basic color temperatures of the image display device depending on whether the user-set color temperature matches one of the basic color temperatures of the image display device; and
    a color coordinate conversion unit to convert the color temperature of the input pixel by moving the input pixel and a reference point of a corresponding conversion range, in the same direction as the reference point to the target point, in an amount proportional to a displacement of the reference point so that the input pixel can be automatically moved along with the reference point.

18. The color temperature conversion apparatus of claim 17, wherein the determination unit comprises:
- a first storage unit to store first information comprising a brightness scaling factor and adjustment factors for variables for determining the conversion range;
- a first calculator to read the first information from the first storage unit and obtains second information based on the first information; and
- a determiner to receive the second information from the first calculator and determine whether the input pixel is to be color-temperature-converted by determining, based on the second information, whether the input pixel is within the conversion range.

19. The color temperature conversion apparatus of claim 18, wherein if the conversion range is an oval, the first information comprises at least the brightness scaling factor and an adjustment factor for a length of a major axis of the oval, an adjustment factor for a length of a minor axis of the oval, an angle of the major axis of the oval with respect to an X-axis of a corresponding color coordinate system.

20. The color temperature conversion apparatus of claim 18, wherein if the conversion range is oval, the second information comprises at least a basic length of the oval, lengths of major and minor axes of the oval, and coefficients for a rotation matrix for the oval.

21. The color temperature conversion apparatus of claim 17, wherein the color coordinate calculation unit comprises:
- a second storage unit to store a plurality of basic color temperatures for each brightness and respective pairs of color coordinates; and
- a second calculator to calculate the color coordinates of the target point, based on the user-set color temperature, through interpolation by using four pairs of sample color coordinates corresponding to combinations of the user-set color temperature and two sample brightnesses selected from the second storage unit.

22. The color temperature conversion apparatus of claim 17, wherein the color coordinate calculation unit comprises:
- a third storage unit to store at least one basic color temperature and pairs of color coordinates corresponding to respective basic brightnesses; and
- a third calculator to calculate the color coordinates of the target point, based on a corresponding basic color temperature, through interpolation using two pairs of sample color coordinates corresponding to combinations of the corresponding one basic color temperature and two sample brightnesses selected from the third storage unit.

23. A color temperature conversion apparatus, receiving an image signal comprising pixels, each pixel having a brightness signal and color difference signals, receiving a user-set color temperature, and converting a color temperature of an input pixel to match the user-set color temperature based on a brightness of the input pixel, the color temperature conversion apparatus comprising:
- a first storage unit to store first information regarding conversion ranges for multiple brightness;
- a determination unit to receive the image signal, read the first information from the first storage unit and determine whether the input pixel is to be color-temperature-converted by determining, based on the first information, whether color difference signals of the input pixel are within a corresponding conversion range;
- a second storage unit to store a plurality of sample color temperatures and respective pairs of sample color coordinates as second information; and
- a color temperature conversion unit, if the input pixel is to be color-temperature-converted, calculating color coordinates of a target point based on the second information and converting a color temperature of the input pixel by moving the input pixel and a reference point of the conversion range, in a direction same as the reference point to the target point in an amount proportional to a displacement of the reference point so that the input pixel can be automatically moved along with the reference point.

24. The color temperature conversion apparatus of claim 23, wherein, if the conversion range is an oval, the first information comprises lengths of major and minor axes of the oval and coefficients for a rotation matrix.

25. A color temperature conversion method, comprising:
- comparing a user-set color temperature for a plurality of pixels with predefined color temperatures;
- calculating color coordinates of a target point, based on the user-set color temperature, when a result of the comparison indicates that no matches have been identified between the user-set color temperature and the predefined color temperatures;
- calculating the color coordinates of the target point based on one of the plurality of predefined color temperatures, when the result of the comparison indicates that a match has been identified between the user-set color temperature and the one predefined color temperature, and
- using at least one processing device for converting the color temperature of a corresponding input pixel, of the plurality of pixels, by moving the input pixel and a reference point of a respective conversion range in a direction same as the reference point to the target point in an amount proportional to a displacement of the reference point, so that the input pixel is capable of being automatically moved along with the reference point of the conversion range.

26. The color temperature conversion method of claim 25, wherein the converting of the color temperature of the corresponding input pixel is dependent on a determination of whether the corresponding input pixel is within a calculated conversion range.

27. A computer readable storage medium comprising computer readable code to control an implementation of the color temperature conversion method of claim 25.

* * * * *